(12) United States Patent
Wildeman et al.

(10) Patent No.: US 11,530,500 B2
(45) Date of Patent: Dec. 20, 2022

(54) DIRECTIONALLY REINFORCED PRODUCTS AND RELATED METHOD

(71) Applicant: TIETEX INTERNATIONAL LTD., Spartanburg, SC (US)

(72) Inventors: Martin Wildeman, Spartanburg, SC (US); Michelis Hardegree, Columbus, NC (US)

(73) Assignee: TIETEX INTERNATIONAL LTD, Spartanburg, SC (US)

( * ) Notice: Subject to any disclaimer, the term of this patent is extended or adjusted under 35 U.S.C. 154(b) by 1341 days.

(21) Appl. No.: 15/845,213

(22) Filed: Dec. 18, 2017

(65) Prior Publication Data

US 2018/0171519 A1    Jun. 21, 2018

Related U.S. Application Data

(60) Provisional application No. 62/435,980, filed on Dec. 19, 2016.

(51) Int. Cl.
*D04B 21/16* (2006.01)
*C09J 7/25* (2018.01)
(Continued)

(52) U.S. Cl.
CPC .............. *D04B 21/165* (2013.01); *B32B 3/08* (2013.01); *B32B 5/022* (2013.01); *B32B 5/08* (2013.01); *B32B 5/10* (2013.01); *B32B 5/26* (2013.01); *B32B 7/09* (2019.01); *B32B 7/12* (2013.01); *B32B 27/08* (2013.01); *B32B 27/12* (2013.01); *B32B 27/30* (2013.01); *B32B 27/304* (2013.01); *B32B 27/32* (2013.01); *C09J 7/255* (2018.01); *B32B 2250/02* (2013.01); *B32B 2250/242* (2013.01); *B32B 2250/246* (2013.01); *B32B 2255/02* (2013.01); *B32B 2255/10* (2013.01); *B32B 2255/26* (2013.01); *B32B 2262/0253* (2013.01); *B32B 2262/0269* (2013.01); *B32B 2262/0276* (2013.01); *B32B 2262/106* (2013.01); *B32B 2262/12* (2013.01); *B32B 2262/14* (2013.01); *B32B 2307/202* (2013.01); *B32B 2307/50* (2013.01); *B32B 2307/54* (2013.01); *B32B 2307/752* (2013.01); *B32B 2405/00* (2013.01); *B32B 2433/02* (2013.01);
(Continued)

(58) Field of Classification Search
None
See application file for complete search history.

(56) References Cited

U.S. PATENT DOCUMENTS 4,722,203 A * 2/1988 Darjee ..................... D04H 3/10
66/190
5,436,064 A * 7/1995 Schnegg ................ A47H 23/08
442/203
(Continued)

*Primary Examiner* — Arti Singh-Pandey
(74) *Attorney, Agent, or Firm* — J.M. Robertson, LLC

(57) ABSTRACT

A stitch-bonded tape or other directionally stabilized product wherein stitch-bonding is carried out by overstitching yarns stitched through a sheeting or other surface substrate in conjunction with the introduction of high tenacity lay-in yarn elements disposed longitudinally in the machine direction of formation to provide strength in the length direction. The overstitching yarns secure the lay-in yarns in place relative to the surface substrate. An adhesive or other coating is disposed in covering relation to the lay-in yarn elements.

21 Claims, 2 Drawing Sheets

(51) Int. Cl.
*B32B 27/32* (2006.01)
*B32B 7/12* (2006.01)
*B32B 27/30* (2006.01)
*B32B 5/26* (2006.01)
*B32B 3/08* (2006.01)
*B32B 27/12* (2006.01)
*B32B 5/10* (2006.01)
*B32B 5/02* (2006.01)
*B32B 5/08* (2006.01)
*B32B 27/08* (2006.01)
*B32B 7/09* (2019.01)

(52) U.S. Cl.
CPC .... *C09J 2467/006* (2013.01); *Y10T 442/2738* (2015.04); *Y10T 442/3667* (2015.04)

(56) References Cited

U.S. PATENT DOCUMENTS

| | | | |
|---|---|---|---|
| 7,294,384 B2 * | 11/2007 | Eleazer | D03D 15/00 428/86 |
| 2007/0037462 A1 * | 2/2007 | Allen | D03D 15/00 442/5 |
| 2015/0299522 A1 * | 10/2015 | Lodde | C09J 7/38 428/220 |

* cited by examiner

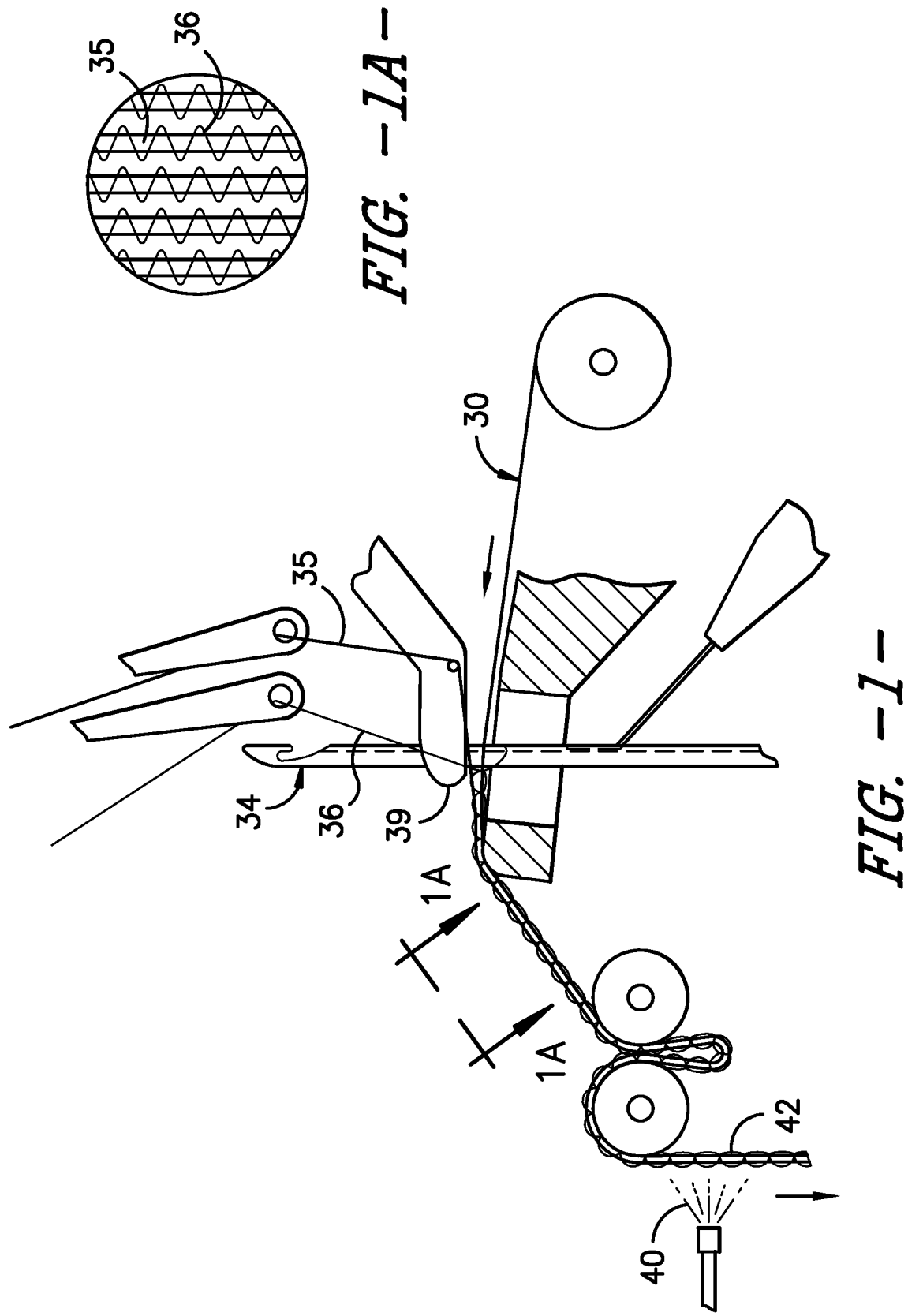

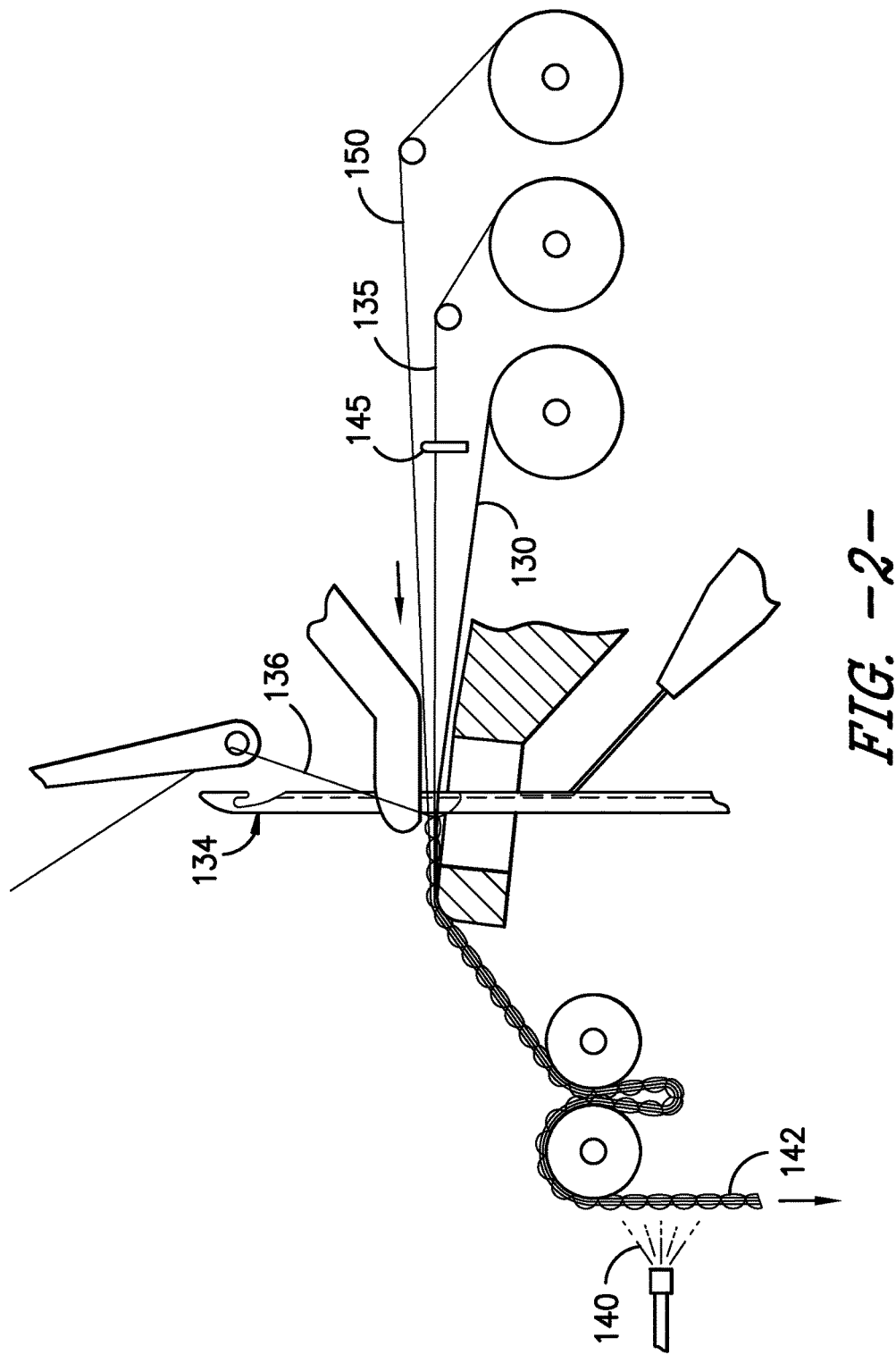
FIG. -2-

DIRECTIONALLY REINFORCED PRODUCTS AND RELATED METHOD

CROSS REFERENCE TO RELATED APPLICATION(S)

This application claims the benefit of, and priority from, co-pending U.S. provisional Application 62/435,980 in the name of Martin Wildeman and Michelis Hardegree having a filing date of Dec. 19, 2016. The contents of such prior application and all documents referenced herein are hereby incorporated by reference in their entity as if fully set forth herein.

TECHNICAL FIELD

The present disclosure relates to a directionally reinforced product such as reinforced duct tape, electrical harness tape, conveyor belting or the like, and more particularly, to a reinforced product in which stabilizing high tenacity yarn elements are secured longitudinally to the surface of a polymer sheeting, fleece or other substrate material by stitch bonding. The resulting composite is adapted to receive an adhesive layer or other coating without the need for a secondary substrate layer.

BACKGROUND OF THE DISCLOSURE

High tenacity tapes and conveyor belting products are well known. Such products often include a thin surface sheeting layer adhesively joined in overlying relation to a textile under layer to form a layered composite. In such a construction, the textile under layer provides stability to the relatively weak surface sheeting layer. In forming tape, an adhesive is applied across the underside of the layered composite to define a familiar tape structure. In forming conveyor belting, coatings such as rubber, and other non-adhesive polymers such as silicone and the like may be applied to define a desired surface. While such a layered arrangements using an intermediate pre-formed textile may produce excellent results, the use of a separate textile layer may increase complexity.

Stitch-bonding is a known process in which yarns are stitched through a substrate to form a coordinated web structure. By way of example only, and not limitation, exemplary stitch-bonding processes are disclosed in U.S. Pat. Nos. 6,855,392; 6,869,660; and 7,294,387 all of which are incorporated by reference as if fully set forth herein. In the past, stitch-bonding has been used in the manufacture of textile under layers for use in tape structures. However, as best known, such stitch-bonding has not been directly incorporated within a sheeting or other surface layer to provide high directional tenacity.

SUMMARY OF THE DISCLOSURE

The present disclosure provides advantages and alternatives over the prior art by providing a tape or other directionally stabilized product such as conveyor belting or the like wherein stitch-bonding is carried out by overstitching yarns through a sheeting or other surface substrate in conjunction with the introduction of high tenacity lay-in yarn elements disposed longitudinally in the machine direction of formation to provide extremely high tenacity in the length direction. In this manner, the overstitching yarns secure the lay-in yarns in place relative to the surface substrate.

Other exemplary aspects of the disclosure will become apparent upon review of the following detailed description of preferred embodiments and practices.

BRIEF DESCRIPTION OF THE DRAWINGS

The accompanying drawings, which are incorporated in, and which constitute a part of this specification, illustrate exemplary constructions and procedures in accordance with the present disclosure and, together with the general description of the disclosure given above and the detailed description set forth below, serve to explain the principles of the disclosure wherein:

FIG. 1 illustrates schematically a first exemplary method for formation of a high tenacity material consistent with the present disclosure;

FIG. 1A is schematic surface view of the high tenacity material formed in the exemplary method of FIG. 1 taken generally along line 1A-1A in FIG. 1; and FIG. 2 illustrates schematically a second exemplary method for formation of a high tenacity tape consistent with the present disclosure.

While exemplary features of the disclosure have been illustrated and are generally described above and will hereinafter be described in connection with certain potentially preferred embodiments and practices, it is to be understood that in no event is the disclosure limited to such illustrated and described embodiments and practices. On the contrary, it is intended that the present disclosure shall extend to all alternatives and modifications as may embrace the general principles of this disclosure within the full and true spirit and scope thereof.

DESCRIPTION OF THE PREFERRED EMBODIMENT(S)

Turning now to the drawings, in FIG. 1 a stitch-bonding apparatus as will be well known to those of skill in the art is illustrated. In the illustrated exemplary practice, a substrate material 30, is conveyed to a stitch-forming position in the direction indicated by the arrow. By way of example only, and not limitation, the substrate material 30 may be a suitable stitchable material such as polyethylene sheeting, PVC sheeting, vinyl sheeting, spunbond polypropylene, spunbond polyester, needlepunched nonwoven, fiber fleece incorporating heat activated bicomponent fibers or other stabilizing constituents and similar substrate materials including combinations of any of the foregoing. In this regard, it is to be understood that by the term "sheeting" is meant any polymer sheet material including both low thickness films and higher thickness sheets which may be stitchable consistent with the present disclosure.

As will be appreciated by those of skill in the art, the stitch-forming position is defined by a row of reciprocating needles 34, extending in adjacent relation to one another across the width of the composite substrate material 30 substantially transverse to the direction of movement of the substrate material 30. While only a single needle has been illustrated, in actual practice a large number of such needles are arranged in close relation to one another in the cross-machine direction between the blades 39 of a hold down device. It is contemplated that the so-called gauge or needle density in the cross machine direction and the stitch density in the machine direction may be adjusted as desired. In one exemplary embodiment, the gauge will be about 14 needles per inch and the stitch density may be about 14 courses per inch. However, higher and lower values may be used if desired.

According to the illustrated exemplary practice, high tenacity lay-in yarn elements 35 (only one shown) are fed from a beam and threaded through the hold-down device through holes in the blades 39. As a result, multiple lay-in yarn elements 35 are arranged in substantially parallel rows extending in the longitudinal direction of the substrate material 30. The lay-in yarn elements are preferably characterized by a linear density greater than about 500 denier and more preferably about 800 denier to about 5000 denier, although significantly larger or smaller lay-in yarn elements may be used if desired. By way of example only, and not limitation, in one exemplary practice the lay-in yarn elements 35 may be a 1000 denier high tenacity polyester yarn, which has particularly low elongation and high strength compared with normal polyester textile yarns. However other high tenacity yarn elements 35 including roving, stacked yarns of lower denier and the like formed from polyester or other materials may also be used if desired. By way of example only, and not limitation, in order to promote characteristics of substantial machine direction strength and low elongation, such yarn elements 35 may include glass rovings having a linear density of about 276 TEX to about 4390 TEX, carbon fibers, aramid yarns and the like including combinations of any of the foregoing.

Concurrently with the delivery of the lay-in yarn elements 35, overstitching yarns 36 are stitched through the substrate material 30 to lock the lay-in yarn elements 35 in place. By way of example only, and not limitation, in accordance with one exemplary practice, the overstitching yarns 36 may be 100 denier flat polyester yarn making a stitch notation of 0,1/2,1 tricot. Of course, other yarn types and stitch notation may be used if desired. By way of example only, other suitable stitch notations may include 1,0/1,2; 1,0/2,3; and the like wherein the stitching yarn is shifted laterally over one or more needle positions between stitches so as to form a zig-zag stitching pattern.

As shown in FIG. 1A, in the resulting stitch-bonded construction, the overstitching yarns 36 cross in a zig-zag pattern between needle rows and act to bind the lay-in yarn elements 35 onto the surface of the substrate 30. Following the stitching operation, an adhesive 40 may be applied across the upper surface in covering relation to the lay-in yarn elements 35 to form a tape precursor. Such an adhesive addition also aids in securing the lay-in yarns in place. Alternatively, other coatings such as rubber, and other non-adhesive polymers such as silicone and the like may be applied across the upper surface in covering relation to the lay-in yarn elements 35 to form a belting. After application of any desired adhesive or other coating material, a slitter (not shown) may then be used to segment the formed web lengthwise in widths corresponding to the desired width. As will be appreciated, such widths may be adjusted as desired for any contemplated use. Regardless of the width achieved by slitting, the resulting product will have an adhesive or other coating overlying the lay-in yarn elements 35 and crossing segments of the overstitching yarns 36. Stitches formed by the overstitching yarns 36 will be disposed across the underside of the substrate material 30 facing away from the lay-in yarn elements.

Another exemplary practice for forming a tape or belting product consistent with the present invention is illustrated in FIG. 2. In the illustrated practice, lay-in yarn elements 135 such as 1000 denier high tenacity polyester yarn or the like may be fed to the stitching position from the back of the stitch-bonding machine. By way of example only, the lay-in yarn elements 135 may be delivered either from beams or from a creel. A comb or sley 145 may be used to align the lay-in yarn elements 135 between the needles 134. Accordingly, the lay-in yarn elements 135 will be arranged in substantially parallel rows at the surface of a substrate material 130 as previously described in relation to FIG. 1.

In the method illustrated in FIG. 2, an optional second substrate 150 may be delivered to the stitching position in opposing relation to the substrate material 130 such that the lay-in yarn elements 135 are sandwiched between the substrate material 130 and the second substrate 150. However, the second substrate 150 may also be eliminated if desired. In the event that a second substrate 150 is used, it may be the same as the substrate material 130 or it may be different if desired.

As in the prior method, overstitching yarns 136 are stitched through the substrate material 130 and any optional second substrate 150 to lock the lay-in yarn elements 135 in place. By way of example only, and not limitation, the overstitching yarns 136 may be 100 denier flat polyester yarn making a stitch notation of 0,1/2,1 tricot. However, other yarn types and stitch notation may be used if desired. By way of example only, other suitable stitch notations may include 1,0/1,2; 1,0/2,3; and the like wherein the stitching yarn is shifted laterally over one or more needle positions between stitches so as to form a zig-zag pattern. In the resulting product, the overstitching yarns 136 crossing in a zig-zag pattern between needle rows act to bind the lay-in yarns 135 in place. Following the stitching operation, an adhesive or other coating 140 as described previously may be applied across the surface to define a precursor material prior to slitting to a desired width.

Practices in accordance with the present disclosure may be adjusted to provide an array of desirable characteristics for particular applications. In accordance with one exemplary practice, the lay-in yarn elements 35, 135 and/or one or more of the substrate materials 30, 130, 150 may be conductive. By way of example only, and not limitation, the lay-in yarn elements may incorporate metal wire and/or conductive particles to permit the conduction of electric current along the length of the resulting tape or other structure. Likewise, the substrate materials 30, 130, 150 may incorporate conductive sheetings and/or particles to permit electrical conduction. It is contemplated that a tape, conveyor belting or other structure incorporating such conductive properties may be beneficial in number of environments of use. By way of example only, such material may find use as a tape for wrapping pipe wherein cathodic protection systems are used to reduce corrosion potential.

In accordance with another exemplary practice, the lay-in yarn elements 35, 135 may be in the form of roving or bundles of stacked yarns rather than single finished yarns. As will be understood, roving is an intermediate product in yarn spinning. In the event that bundles of stacked yarns are used, at least a portion of the stacked yarns may have a linear density of about 100 denier to about 500 denier, although larger and smaller stacked yarns may be used if desired. In accordance with one exemplary practice, the roving or stacked yarn bundles may be penetrated by stitching needles 34, 134 during the stitch-bonding procedure. Such penetration will thereby split the roving or stacked yarn bundles along the longitudinal machine direction to define elongated machine direction lay-in yarn structures functioning in the same manner as in the same manner as individual finished lay-in yarns.

As noted previously, in accordance with another exemplary practice, the substrate material 30, 130 may include fiber fleece incorporating heat activated bicomponent fibers or other stabilizing constituents. As will be appreciated, such materials typically include a percentage of relatively low melting point polymer in combination with compatible higher melting point polymer. In this regard, heat activated bicomponent fibers typically include a sheath of material such as low melting point polyester or the like surrounding a core of higher melting point materials such as standard melting point polyester or the like. When heat is applied, the low melting point sheath material at least partially melts and flows around adjacent fibers within the fiber matrix while the core material remains substantially intact. When the heat is removed, the melted sheath material then recovers its solid state and forms point bonding between previously independent fibers within the fiber matrix. The resulting fibrous matrix is thereby stiffened and strengthened. Of course, such point bonding is not limited to the use of such core/sheath materials, and may also be achieved by using a fiber blend incorporating a percentage of heat activated low melting point fibers if desired.

The use of a substrate material incorporating fiber fleece having heat activated bicomponent fibers or other stabilizing constituents may provide the benefit of substantially stiffening the resulting stitch-bonded product in the cross-machine direction. Such stiffening in the cross-machine direction may be beneficial in eliminating the need to incorporate additional yarn elements to provide such cross-machine stability. By way of example only, and not limitation, such cross-machine stability may be particularly beneficial in applications such as conveyor belting and the like wherein dimensional stability in both the machine direction and the cross-machine direction may be useful.

Regardless of the method used, the resulting structure will incorporate rows of high tenacity lay-in yarn elements running in the length direction (i.e. the machine direction) of the formed structure. These lay-in yarn elements are secured in place by the overstitching yarns so as to maintain their orientation and to form a pattern of stitches 42, 142 across the surface facing away from the lay-in yarn elements. The presence of the lay-in yarn elements provides the final product with substantial tensile strength and low elongation in the longitudinal direction with no need for a secondary textile layer. However, the product can nonetheless be readily segmented in the length direction as may be desired.

Non-limiting examples of stitch-bonded materials suitable for use in tape structures and the like will now be described.

EXAMPLE 1

A stitch-bonded fabric suitable for direct application of an adhesive or other coating was produced using a 1000 denier, 192 filament semi-dull round high tenacity polyester lay-in yarn and a 150 denier 36 filament semi-dull round polyester stitching yarn using a system as illustrated in FIG. 1. The stitching yarn was stitched through a consolidated polyester fleece substrate material having a mass per unit area of 85 grams per square meter. The stitch-bonding process was carried out using a machine setting of 14 stitch lines per inch in the cross-machine direction and 14.1 stitches per inch in the machine direction. The lay-in yarn was applied in a so called "Full Threaded" pattern between needles. The stitching yarn was fully threaded so as to engage every needle and was stitched at a notation of 0-1/2-1//. The heat set finished fabric had a mass per unit area of 150.1 grams per square meter.

The heat set finished fabric was tested for tensile strength according to test specification ASTM D5034. The finished fabric exhibited elongation characteristics as follows:
  7.6 pounds force at 1% elongation;
  27.2 pounds force at 2% elongation;
  58.3 pounds force at 5% elongation; and
  417 pounds force at failure.

EXAMPLE 2

A stitch-bonded fabric suitable for direct application of an adhesive or other coating was produced using a 1000 denier, 192 filament semi-dull round high tenacity polyester lay-in yarn and a 150 denier 36 filament semi-dull round polyester stitching yarn using a system as illustrated in FIG. 1. The stitching yarn was stitched through a fleece substrate material of 65% polyester staple and 35% core/sheath bi-component polyester having a low melting point sheath surrounding a higher melting point core. The substrate material had a mass per unit area of 200 grams per square meter prior to processing. The stitch-bonding process was carried out using a machine setting of 14 stitch lines per inch in the cross-machine direction and 14.1 stitches per inch in the machine direction. The lay-in yarn was applied in a so called "Full Threaded" pattern between needles. The stitching yarn was fully threaded so as to engage every needle and was stitched at a notation of 0-1/2-1//. The heat set finished fabric had a mass per unit area of 235.3 grams per square meter.

The heat set finished fabric with activated bi-component fiber was tested for tensile strength according to test specification ASTM D5034. The finished fabric exhibited elongation characteristics as follows:
  19.7 pounds force at 1% elongation;
  70 pounds force at 2% elongation;
  146.6 pounds force at 5% elongation; and
  543.6 pounds force at failure.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A directionally stabilized composite of stitch-bonded construction having a machine direction and a cross-machine direction, the stabilized composite comprising:
    at least a first stitching substrate material;
    a plurality of elongated lay-in yarn elements disposed in substantially parallel relation to one another in the machine direction of the stabilized composite in overlying, juxtaposed relation to the first stitching substrate material;
    a plurality of stitching yarns stitched through the stitching substrate material in a zig-zag pattern defining yarn segments in overlying, crossing relation to the lay-in yarn elements such that the stitching yarns secure the lay-in yarn elements in place relative to the first stitching substrate material, the stitching yarns defining a plurality of stitches across a surface of the first stitching substrate material facing away from the lay-in yarn elements; and
    a coating disposed in covering relation to the lay-in yarn elements.

2. The stabilized composite as recited in claim 1, wherein the first stitching substrate material is a polymer sheeting.

3. The stabilized composite as recited in claim 2, wherein the plurality of elongated lay-in yarn elements comprise yarns having a linear density greater than 500 denier.

4. The stabilized composite as recited in claim 3, wherein the coating is an adhesive.

5. The stabilized composite as recited in claim 4, wherein the stabilized composite is slit into longitudinal strips defining adhesive tape.

6. The stabilized composite as recited in claim 1, wherein the first stitching substrate material is a polymer sheeting, wherein the plurality of elongated lay-in yarn elements comprise yarns having a linear density greater than 500 denier and wherein the coating is a non-adhesive polymer.

7. The stabilized composite as recited in claim 1, wherein the first stitching substrate material is a polymer sheeting and the plurality of elongated lay-in yarn elements comprise rovings.

8. The stabilized composite as recited in claim 7, wherein the coating is an adhesive.

9. The stabilized composite as recited in claim 8, wherein the stabilized composite is slit into longitudinal strips defining adhesive tape.

10. The stabilized composite as recited in claim 1, wherein the first stitching substrate material is a polymer sheeting, wherein the plurality of elongated lay-in yarn elements comprise rovings and wherein the coating is a non-adhesive polymer.

11. The stabilized composite as recited in claim 1, wherein the first stitching substrate material is a polymer sheeting and the plurality of elongated lay-in yarn elements comprise bundles of stacked yarns.

12. The stabilized composite as recited in claim 11, wherein the coating is an adhesive.

13. The stabilized composite as recited in claim 12, wherein the stabilized composite is slit into longitudinal strips defining adhesive tape.

14. The stabilized composite as recited in claim 1, wherein the first stitching substrate material is a polymer sheeting, wherein the plurality of elongated lay-in yarn elements comprise bundles of stacked yarns and wherein the coating is a non-adhesive polymer.

15. The stabilized composite as recited in claim 1, further comprising a second stitching substrate material disposed in overlying relation to the first stitching substrate material and to the plurality of elongated lay-in yarn elements.

16. The stabilized composite as recited in claim 1, wherein the first stitching substrate material is a fiber fleece, wherein the plurality of elongated lay-in yarn elements comprise yarns having a linear density greater than 500 denier and wherein the coating is an adhesive.

17. The stabilized composite as recited in claim 16, wherein the stabilized composite is slit into longitudinal strips defining adhesive tape.

18. The stabilized composite as recited in claim 1, wherein the first stitching substrate material is a fiber fleece comprising a plurality of heat activated fiber to fiber bonds formed by melted and re-solidified fiber constituents, wherein the plurality of elongated lay-in yarn elements comprise yarns having a linear density greater than 500 denier and wherein the coating is a non-adhesive polymer.

19. The stabilized composite as recited in claim 1, wherein the first stitching substrate material is a fiber fleece comprising a plurality of heat activated fiber to fiber bonds formed by melted and re-solidified fiber constituents and the plurality of elongated lay-in yarn elements are selected from the group consisting of rovings, bundles of stacked yarns, carbon fibers, aramid yarns and combinations thereof.

20. The stabilized composite as recited in claim 19, wherein the coating is an adhesive and wherein the stabilized composite is slit into longitudinal strips defining adhesive tape.

21. The stabilized composite as recited in claim 1, wherein the first stitching substrate material is a fiber fleece comprising a plurality of heat activated fiber to fiber bonds formed by melted and re-solidified fiber constituents and the plurality of elongated lay-in yarn elements are selected from the group consisting of rovings, bundles of stacked yarns, carbon fibers, aramid yarns and combinations thereof and wherein the coating is a non-adhesive polymer.

* * * * *